(12) United States Patent
Mendoza Vicioso et al.

(10) Patent No.: US 9,758,100 B2
(45) Date of Patent: Sep. 12, 2017

(54) FOLDING REARVIEW MIRROR FOR MOTOR VEHICLES

(71) Applicant: FICO MIRRORS, S.A., Barcelona (ES)

(72) Inventors: José Mendoza Vicioso, Barcelona (ES); Daniel Crespo Febrero, Barcelona (ES)

(73) Assignee: FICO MIRRORS, S.A., Barcelona (ES)

( * ) Notice: Subject to any disclaimer, the term of this patent is extended or adjusted under 35 U.S.C. 154(b) by 166 days.

(21) Appl. No.: 14/285,393

(22) Filed: May 22, 2014

(65) Prior Publication Data

US 2014/0347755 A1  Nov. 27, 2014

(30) Foreign Application Priority Data

May 23, 2013  (ES) .................................. 201330748

(51) Int. Cl.
*B60R 1/074*  (2006.01)
*B60R 1/076*  (2006.01)
*G02B 7/182*  (2006.01)

(52) U.S. Cl.
CPC .............. *B60R 1/076* (2013.01); *B60R 1/074* (2013.01); *G02B 7/182* (2013.01)

(58) Field of Classification Search
None
See application file for complete search history.

(56) References Cited

U.S. PATENT DOCUMENTS

| 6,022,113 A | 2/2000 | Stolpe et al. |
| 6,132,050 A | 10/2000 | Sakata et al. |
| 6,322,221 B1 * | 11/2001 | van de Loo ............ B60R 1/074 248/479 |
| 7,303,294 B1 | 12/2007 | Ruse et al. |
| 7,314,285 B2 | 1/2008 | Ruse et al. |
| 7,374,299 B2 | 5/2008 | Brouwer et al. |
| 7,543,949 B2 | 6/2009 | Van Den Brink et al. |
| 7,547,855 B2 | 6/2009 | Brouwer et al. |
| 7,847,205 B2 | 12/2010 | Brouwer et al. |
| 8,129,642 B2 | 3/2012 | Brouwer et al. |
| 8,313,202 B2 | 11/2012 | Van Stiphout et al. |
| 8,366,284 B2 | 2/2013 | Flynn et al. |
| 8,366,285 B2 | 2/2013 | Reedman et al. |
| 9,308,866 B2 * | 4/2016 | Palvoelgyi ............. B60R 1/074 |
| 2006/0285254 A1 | 12/2006 | Ruse et al. |

(Continued)

FOREIGN PATENT DOCUMENTS

EP  0644084 B1  5/1998
EP  2021209 B1  9/2009

(Continued)

*Primary Examiner* — Derek S Chapel
(74) *Attorney, Agent, or Firm* — Peter B. Scull; Hamilton, DeSanctis & Cha LLP

(57) ABSTRACT

A base member fixed to a vehicle, a housing with a rearview mirror, a motor component to rotate the rearview housing relative to the base, two sets of ramps independent of each other, capable of sliding on corresponding fixed ramps of the base element and first and second resilient elements. The ramps of the first and second sets have different inclinations and the resilient elements have different spring rates from one another, depending on whether the drive housing is manually or motor driven.

15 Claims, 3 Drawing Sheets

(56) References Cited

U.S. PATENT DOCUMENTS

| | | |
|---|---|---|
| 2007/0035862 A1 | 2/2007 | Brouwer et al. |
| 2007/0084707 A1 | 4/2007 | Van Den Brink et al. |
| 2007/0099743 A1* | 5/2007 | Reedman ................ B60R 1/074 475/300 |
| 2009/0229962 A1 | 9/2009 | Brouwer et al. |
| 2009/0303625 A1 | 12/2009 | Van Stiphout et al. |
| 2010/0060024 A1 | 3/2010 | Flynn et al. |
| 2010/0238570 A1 | 9/2010 | Reedman et al. |
| 2011/0068662 A1 | 3/2011 | Brouwer et al. |
| 2012/0087026 A1 | 4/2012 | Schuurmans et al. |
| 2012/0162796 A1 | 6/2012 | Van Zuijlen et al. |
| 2013/0038957 A1 | 2/2013 | Van Stiphout et al. |
| 2013/0321941 A1 | 12/2013 | Van Stiphout et al. |

FOREIGN PATENT DOCUMENTS

| | | |
|---|---|---|
| EP | 1755923 B1 | 3/2010 |
| EP | 1711372 B1 | 11/2011 |
| EP | 2439106 B1 | 12/2012 |
| EP | 2159102 B1 | 10/2013 |
| WO | WO2005075249 A1 | 8/2005 |
| WO | WO2010151120 A1 | 12/2010 |
| WO | WO2012047104 A9 | 5/2012 |

\* cited by examiner

FOLDING REARVIEW MIRROR FOR MOTOR VEHICLES

TECHNICAL FIELD

The present disclosure relates to a rearview mirror for motor vehicles and, particularly, to an exterior rearview mirror of the type that can be folded from an operating position, substantially transverse to the vehicle body, to a folded position, aligned substantially lengthwise with the vehicle body, and vice versa.

BACKGROUND

Currently folding rearview mirrors mounted outside the motor vehicles often use electric drive means for arranging the rearview mirror from an operating position to a folded position, and vice versa. Thus, the housing receiving the rearview mirror assembly can be driven in rotation to arrange it from the operating position to the folded position and vice versa through electric means or through manual means, as required by circumstances or needs.

In practice, one of the main problems encountered in this type of rearview mirrors is wind noise produced when the vehicle is moving. Noise, which adversely affects motor vehicle driving comfort, is due to the clearance between moving parts of the mirror assembly. Specifically, noise is due to the clearance between said rotating rearview mirror housing and the base element that is mounted fixed on the vehicle body and around which the rearview mirror housing is rotated when it is actuated.

The most common way to remove noise produced by the wind acting on said clearance is to provide a flexible seal between the moving parts of said type of rearview mirrors. In principle, providing a seal in the clearance between the rearview mirror housing and the base element solves the problem of wind noise when the vehicle is moving. However, this seal is often subjected constantly to friction produced as the rearview mirror housing is rotated relative to the base element when the rearview mirror is operated by the user from the operating position to the folded position and vice versa.

This friction during several cycles of rotation of the housing results in severe wear of the seal, which may become deteriorated, negatively affecting effectiveness. When the seal is worn as a given number of rotational operating cycles of the rearview mirror housing have been undergone, said seal can no longer perform its function efficiently to the extent that wind noise reappears again when the vehicle is moving. Furthermore, such friction causes high consumption of the motor resulting in that the motor itself loses mechanical properties, and even the total effectiveness earlier than foreseen.

To avoid this problem, the problem of wind noise that occurs when the vehicle is moving is currently addressed by supplementing said joint with a mechanism capable of displacing, i.e. moving away from and/or closer to, the rearview mirror housing relative to the base element when the former is driven to be rotated relative to the latter. This mechanism allows the two moving parts (housing and base) snugly fitted together when the mirror is in the operating position, allowing both elements to be moved away when the mirror is rotated for folding it. This mechanism usually consists of a series of wedges or ramps having an inclination designed for properly moving away or moving closer both elements together as they are rotated to each other.

Document WO2010151120 discloses a rearview mirror of this type. In this case, the rearview mirror includes a ramp arrangement, as stated above. In this particular case, the ramps are formed internally in the mirror mechanism, integral with a gearwheel for driving the mirror housing and the base element. Resilient members are provided adapted for pressing the mirror housing and the base element together. The main disadvantage of this solution is the large inclination that is required for the ramps in order to define the operating and folding end positions. This means that the motor has to work very hard to overcome the inclination which adversely affects motor consumption and service life.

Document EP2159102 relates to a rearview mirror that also uses an inclination system formed in the base element and the mirror housing to move the mirror housing relative to the base element when driven in rotation. The mirror provided in this document further includes a resilient member for pushing the mirror housing to the base element. This configuration is complex and requires high energy consumption as the force exerted by the high spring rate, single compression spring, which is provided to hold the assembly in a determined position, should be exceeded. Again, this results in that the motor has to work very hard to overcome the resistance by the resilient element, which adversely affects motor consumption and service life.

Although both solutions allow displacement between the mirror housing and the base element in order to minimize the effect of friction on the seal, or even to dispense with it, there however remains a need for a folding rearview mirror that is effective, simple, low consumption and cost effective. This is effectively achieved by a folding rearview mirror for motor vehicles such as the one to be described below. With the present rearview mirror additional technical advantages are also obtained, as will be seen hereinbelow.

DESCRIPTION

The present folding rearview mirror for motor vehicles includes a base element which is intended to be mounted fixed on a motor vehicle, for example on the outside of the vehicle body. The folding rearview mirror that is described further comprises a housing. This housing is suitably adapted for housing a mirror element.

A motor component is also provided. The motor component is adapted to rotate the rearview mirror housing relative to the base element between an operating position and a folding position of the rearview mirror, and vice versa. Specifically, the motor component may comprise an electric motor received in a recess. The motor is linked to a driving mechanism for transmitting rotation of its shaft into rotation of the rearview mirror housing. Specifically, the motor of the motor component may comprise a gearwheel whose teeth mesh with corresponding fixed teeth of the base element.

According to an important feature of the present rearview mirror, at least a first set of ramps and a second set of ramps are provided. Specifically, the ramps of the first set of ramps and the ramps of the second set of ramps are independent of each another. As it will be further described below, actuation or movement of either set of ramps depends on whether the rearview mirror housing is rotated by manual operation or through the motor assembly. The ramps of the second set of ramps can be moved relative to the ramps of the first set of ramps when the rearview mirror housing is driven by the motor. As it will be further described below, actuation or movement of either set of ramps depends on whether the mirror housing is rotated by manual operation or through the motor assembly. There may be cases, however, in which the ramps of the first set move together with the ramps of the second set. This may for example occur if the rearview mirror housing is accidentally actuated manually while the motor assembly is driving said rearview mirror housing.

The ramps of the first and second sets of ramps are adapted to slide on corresponding fixed ramps which are formed on the base element. The fixed ramps of the base element associated with the ramps of the first set of ramps may differ from the fixed ramps of the base element associated with the ramps of the second set of ramps.

Sliding of ramps of the first and the second set of ramps on the ramps of the base element as the housing is rotatably driven does not occur at the same time, as noted above, and it depends on how the rearview mirror housing is being driven to rotate with respect to the base element between the operating position and the folding position of the mirror. As also stated, driving of the rearview mirror housing to rotate relative to the base element results in the movement of the rearview mirror housing relative to the base element for overcoming the seal.

In a particular example of this configuration, the first set of ramps is formed on a gearwheel which is part of the motor component. The teeth of the gearwheel mesh with the corresponding fixed teeth of the base element.

This first set of ramps is associated with manual actuation of the rearview mirror housing, that is, they are moved, driven or actuated when the mirror is manually rotated by the user. For its part, the second set of ramps is formed in the outer housing of the motor assembly, and thus it is formed in an outermost area of the motor assembly relative to the ramps of the first set, which are formed in an innermost area of the motor assembly. This second set of ramps is associated with actuation of the rearview mirror housing through the motor assembly (automatic, electric folding of the mirror). In both cases, as stated, the ramps of the first and second sets are adapted to slide on corresponding fixed ramps formed on the base element when the rearview mirror housing is rotated relative to the element to cause the rearview mirror housing to be displaced relative to the base element.

The ramps of the first set of ramps have an inclination adapted for manually driving the rearview mirror housing to rotate relative to the base element as stated. For its part, the ramps of the second set of ramps have an inclination equal to or smaller than the first set of ramps, suitable for driving the rearview mirror housing to rotate relative to the base element by the motor component.

A smaller inclination of the ramps of the second set of ramps relative the first set of ramps for moving the rearview mirror housing relative to the base element allows the consumption of the motor in the motor component to be significantly reduced. Furthermore, this configuration advantageously extends the motor service life as less resistance has to be overcome due to the smaller inclination of the ramp. The displacement of the rearview mirror housing relative to the base element by the second set of ramps, through the motor component, may be of the order of 1 mm.

Therefore, the displacement of the rearview mirror housing relative to the base element, that is, mutually moving closer to and/or moving away (separating) these elements, when carried out automatically by the motor component, requires lower driving torque than when carried out manually since, as stated, the ramps of the second set are less inclined than the first one and also lower stiffness resilient element is provided associated with the motor drive relative to manual drive as discussed later. The possibility of providing less inclined ramps for motor drive with respect to the mirrors of this type heretofore used in the art is remarkably advantageous in terms of consumption and reliability, always with the advantage of a significant reduction of vibration and noise during vehicle driving.

The fact that actuation of the rearview mirror through the motor component is independent of the manual operation of the rearview mirror allows the function for displacing of the rearview mirror housing relative to the base element by the motor component to be cancelled or suppressed in the event that such function is not required or is not necessary. This possibility of having or not the function for displacing the rearview mirror housing relative to the base element through the motor component is achieved with the same motor assembly with the above described configuration.

As indicated above, the present rearview mirror may include a resilient element. This resilient element is intended to hold the rearview mirror housing in a given angular position and they are adapted to provide for a uniform and continuous movement of the rearview mirror housing.

In particular, a first resilient element for pushing the rearview mirror housing to the base element during manual operation of the rearview mirror housing is provided. This first resilient element may comprise one spring or multiple springs, for example one or more compression springs, although they are not limited to such examples.

A second resilient element may be also provided adapted for pushing the rearview mirror housing to the base element during (electric) motor driving of the rearview mirror housing. In some particular cases, the second resilient element may be arranged for pushing the rearview mirror housing to the base element through the motor component, specifically through the recess where the motor is received. The second resilient element may comprise an elastic ring which, during operation, is capable of being compacted to a thickness between 0.1 and 10 mm, for example between 2 and 6 mm.

In general, it is preferred that the first resilient element has a spring rate higher than that of the second resilient element. As indicated above, the different spring rate between the first resilient element and the second resilient element allows power required by the motor to be reduced, while maintaining the rearview mirror housing strength against rotation in manual operation. This advantageously allows the motor service life component to be extended.

The present folding rearview mirror may further include a low-friction wear-resistant ring arranged between the base element and the rearview mirror housing. In some examples, the low-friction wear-resistant ring may be arranged between the base element and the motor component.

With the described configuration an exterior rearview mirror for motor vehicles is achieved with which it is possible to reduce or even eliminate wear on the seal that is fitted between the base element and the rearview mirror housing, when both elements are rotated to each other when folding or unfolding the mirror. When a seal is used, its service life is advantageously extended, with their characteristics left intact to effectively perform its main function of eliminating wind noise during vehicle driving. The configuration of this folding mirror allows even dispense with the use of the seal since an assembly without play between the rearview mirror housing and the base element is possible. Electric motor consumption is also reduced as friction of the housing with the seal during actuation by the motor assembly is avoided.

Additional objects, advantages and features of examples of the present rearview mirror will be clear to those skilled in the art upon examination of the description, or may be learned by practice thereof.

BRIEF DESCRIPTION OF THE DRAWINGS

One particular example of the many examples of the present rearview mirror will be described by way of a non-limiting example with reference to the accompanying drawings, in which.

DETAILED DESCRIPTION OF PREFERRED EXAMPLE

Figure 1:
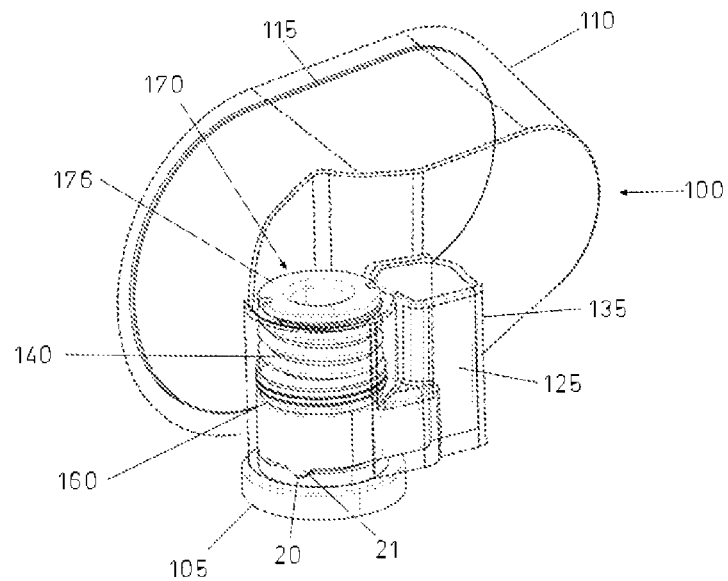
FIG. 1 is a perspective view showing one example of the rearview mirror in one operating position substantially transverse to the vehicle body.

One example of a folding rearview mirror for motor vehicles is shown in the figures. In said figures, the mirror has been generally indicated by reference numeral 100.

The rearview mirror 100 comprises a base element or foot 105. The base element 105 is adapted to be mounted fixed on the outside of the body of a motor vehicle, in a position suitable for vision when driving.

The rearview mirror 100 further comprises a housing 110. The housing 110 is mounted so that it can be rotated relative to the base element 105. A mirror element 115 is received in the housing 110.

Figure 2:
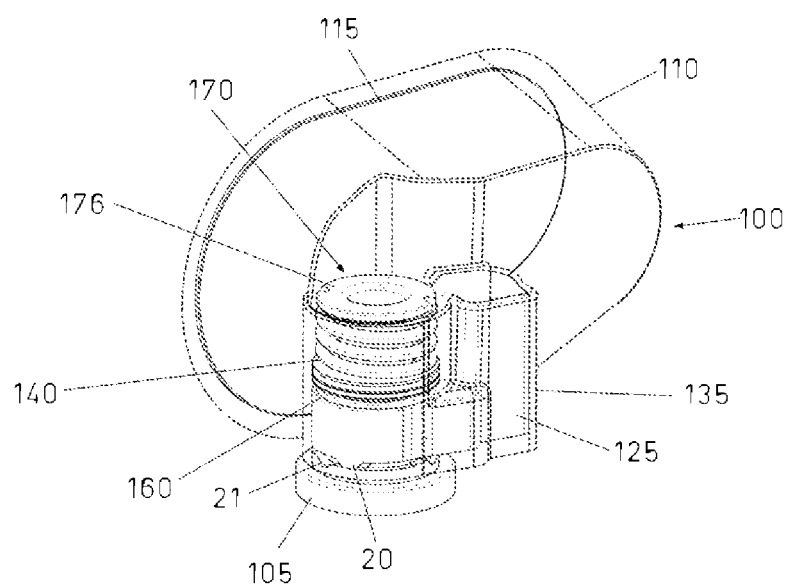
FIG. 2 is a perspective view, similar to FIG. 1, showing the rearview mirror in a folded position, aligned substantially lengthwise with the vehicle body.

On the opposite side where the mirror element 115 is provided, the housing 110 has a recess 135 associated therewith for a motor component 120. The motor component 120 is adapted to rotate the rearview mirror housing 110 relative to the base element 105 between a mirror operating position, shown in FIG. 1, and a mirror non-operating position, shown in FIG. 2, in which it is folded. Rotation of the rearview mirror housing 110 relative to the base element 105 is carried out around the axis of rotation Y, depicted in FIG. 3.

Additionally, the motor component 120 further comprises a recess 125. The recess 125 is formed integrally with the rearview mirror housing 110. The rearview housing 110 is intended to receive an electric motor therein. Preferably, the motor component 120 is mounted inside the recess 135 in the housing such that it can be easily removed to facilitate repair or maintenance operations.

The electric motor is mechanically connected to a driving mechanism 130. In the particular case shown in the figures, the driving mechanism comprises a gearwheel associated with the electric motor 130, which is shown in exploded view in FIG. 3 and in the enlarged drawing in FIG. 4. The teeth of the gearwheel 130 mesh with corresponding fixed teeth of the base element 105. Thus, rotation of the electric motor shaft causes rotation of the housing 110 around axis Y relative to the base element 105 of the mirror 100.

In the example shown in the figures, the rearview mirror 100 includes a first set of ramps 10 and a second set of ramps 20. The ramps of the first set of ramps 10 are different from and independent of the ramps of the second set of ramps 20. This means that the ramps of the set of ramps can be moved relative to the ramps of another set of ramps. For example, the ramps of the first set of ramps 10 may be fixed while the ramps of the second set of ramps 20 move.

Figure 3:
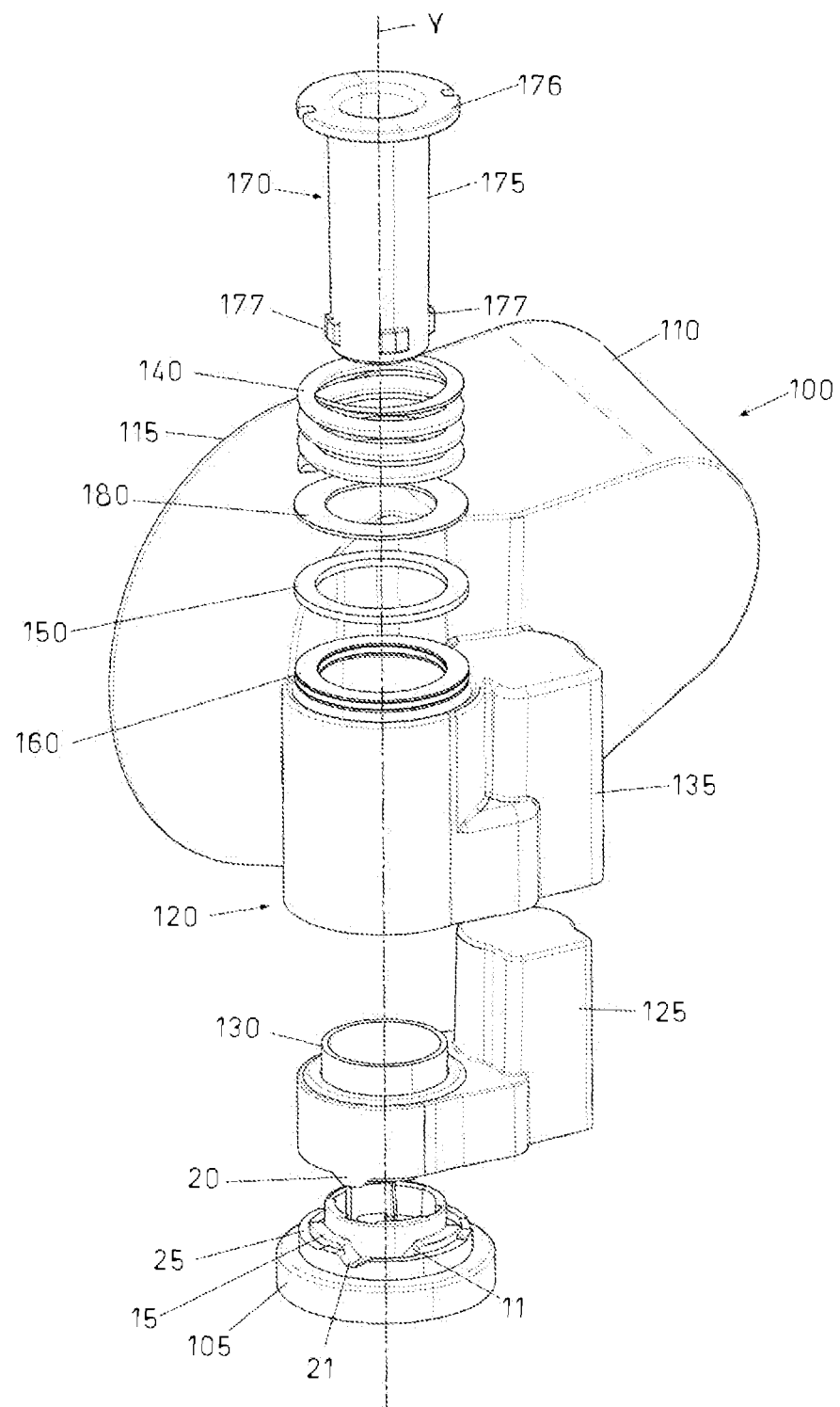
FIG. 3 is an exploded perspective view of the rearview mirror of FIGS. 1 and 2.

The ramps of the first and second sets of ramps 10, 20 are designed to slide on corresponding fixed ramps 11, 21 formed on the base element 105. In the example shown, the fixed ramps 11 of the base element 105 on which the ramps of the first set of ramps 10 act are different from the fixed ramps 21 of the base element 105 associated with the ramps of the second set of ramps 20, according to the different configuration of the first and second sets of ramps 10, 20, as shown in FIGS. 3 and 4 of the drawings.

With this configuration, when the rearview mirror housing 110 is rotated relative to the base element 105 between the operating position and the folded position, or vice versa, a progressive displacement (gradually moving closer to or moving away from) the rearview mirror housing 110 relative to the base element 105. In returning from the folded position to the operating position the rearview mirror housing 110 and the base element 105 move closer to each other returning to the original operating position.

Driving the rearview mirror housing 110 to rotate relative to the base element 105 around the axis of rotation Y can be carried out manually by acting on the first set of ramps 10, or through said motor assembly 120 by acting on the second set of ramps 20. The ramps of the first set of ramps 10 have an inclination suitable for manual actuation to rotate the rearview mirror housing 110 relative to the base element 105. For its part, the ramps of the second set of ramps 20 have an inclination equal to or less than the inclination of the first set of ramps 10, suitable for driving the rearview mirror housing 110 to rotate relative to the base element 105 by the aforementioned component motor 120.

Figure 4:
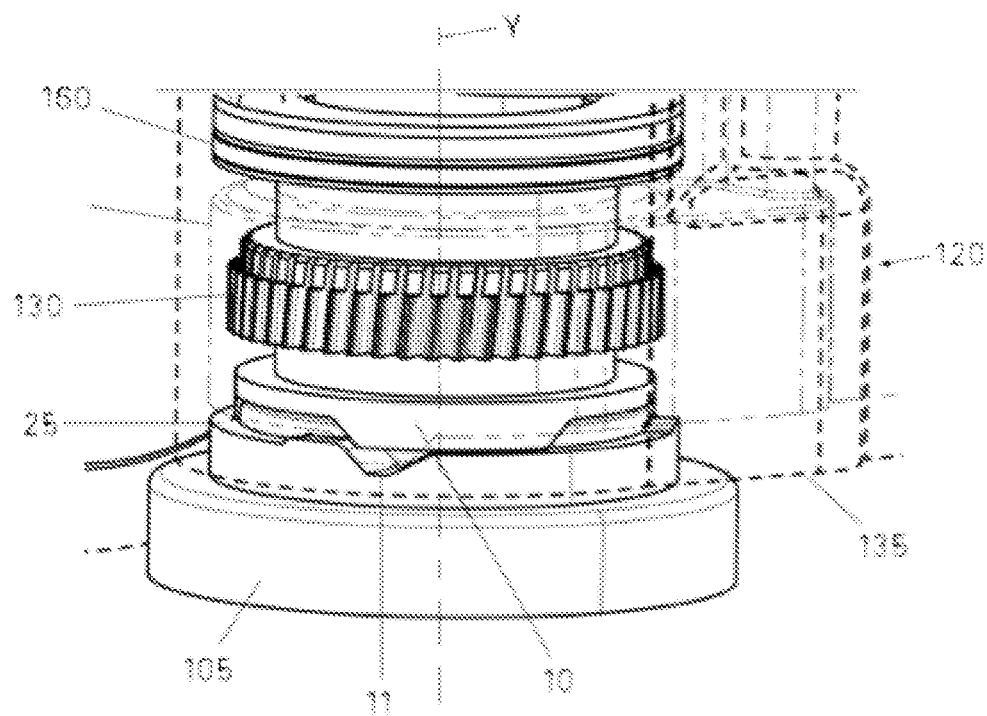
FIG. 4 is an enlarged part view of the rearview mirror as shown in the perspective view of FIG. 1.

The ramps of the first set of ramps 10 are shown in the enlarged view of FIG. 4. These ramps are formed in the gearwheel 130 of the motor itself and, as noted above, they are adapted to slide on corresponding ramps 11 formed in the base element 105 to manually actuate the rearview mirror housing 110 to rotate.

For its part, the ramps of the second set of ramps 20 are formed in the recess 125 of the motor component 120. These ramps 20, as noted above, are adapted to slide on corresponding ramps 21 formed in the base element 105 to actuate the mirror housing 110 to be rotated by the motor. In this case, as stated above, the ramps 11, 21 of the base element 105 associated with the first and second set of ramps 20, respectively, are generally different, in terms of configuration (mainly in terms of inclination) although in some examples they may be equal.

The ramps of the first set of ramps 10 are arranged in an innermost area with respect to the ramps of the second set of ramps 20, which are arranged in an outermost area of the motor assembly 120.

When the rearview mirror 100 is driven by the motor component 120, the rearview mirror housing 110 is rotated relative to the base element 105 between the operating position of the rearview mirror and the folding position (or vice versa) such that the ramps of the second set 20, formed in the motor recess 125, slide on the corresponding ramps 21 of the base element 105. This causes the rearview mirror housing 110 to move closer to or away from the base element 105.

When the rearview mirror 100 is driven manually, the rearview mirror housing 110 is rotated relative to the base element 105 between the operating position and the folded position of the mirror (or vice versa) so that the ramps of the first set 10 formed on the gearwheel 130 of the motor component 120, slide on the corresponding ramps 11 of the base element 105, causing the rearview mirror housing 110 to move closer to or away from the base element 105.

As stated above, the inclination of the ramps of the second set of ramps 20 is equal to or less than the inclination of the first set of ramps 10 and the actuation of the first or second set of ramps 10, 20 is independent of each other. Thus, the power of the electric motor of the motor assembly is less to rotate the rearview mirror housing relative to the base element, thus reducing consumption and extending its service life. The separation distance of the rearview mirror housing 110 to the base element 105 through the second set of ramps 20, by the motor component 120, may be of the order of about 1 mm.

As actuation of the rearview mirror 100 is independent, either through the motor component 120 or by manual actuation, it is possible to cancel or suppress the separating function for moving the rearview mirror housing 110 away from the base element 105 by the motor component if said function is not required, or it is not necessary. This possibility of having or not the separating function of the rearview mirror housing 110 is obtained through the same motor component 120 with the above described configuration of two independent, different sets of ramps 10, 20.

The rearview mirror 100 further includes a compression spring 140 as first resilient element, as clearly shown in the exploded view of FIG. 3. In operation, the compression spring 140 tends to push the rearview mirror housing 110 to the base element 105, and particularly during manual rotating operation of the rearview mirror housing 110 relative to the base element 105.

In combination with the compression spring 140, an elastic ring 150 as second resilient element is provided, as shown in the exploded view of FIG. 3. This elastic ring 150, which may be foam or even steel, and in general any material that, by nature or configuration, is resilient and behaves well at all operating temperature ranges. This elastic ring 150 has a spring rate lower than that of the compression spring 140, capable of exerting sufficient pressure to hold the rearview mirror housing 110 against the base element 105. Due to the fact that when actuation is performed in a given direction the force of gravity promotes movement, the elastic ring 150 may have a low spring rate, which further contributes to electric motor consumption savings.

The elastic ring 150 also tends to push the rearview mirror housing 110 to the base element 105, both in the operating position and in use, during driving of the rearview mirror housing 110 to rotate it relative to the base element 105 the motor component 120. Thrust of the elastic ring 150 of the rearview mirror housing 110 on the base element 105 during electric drive is carried out through the motor component 120. This elastic ring 150 can become compacted during electric drive to a thickness between 0.1 and 10 mm, and more preferably between 2 and 6 mm.

Accordingly, the higher spring rate of the first resilient element (spring) 140, in combination with the greater inclination or height of the first set of ramps 10, for manual operation versus the lower spring rate of the second element (elastic ring) 150, in conjunction with the less inclination or height of the second set of ramps 20, for driving through the motor assembly 120 allows the mechanical characteristics to be separated based on the type of driving in rotation of the rearview mirror housing 110 relative to the base element 105 and consequently the electric motor consumption to be reduced as a lower torque is required. At the same time, it becomes possible to advantageously extend the service life of the electric motor. All of this is achieved in conjunction with the displacement function of the mirror housing 110 relative to the base element 105 as it is driven in rotation around the axis of rotation Y to allow an assembly with no clearance, preventing the seal (not shown in the examples of the drawings) provided between the rearview mirror housing 110 and the base element 105 from being degraded. By this, the overall goal of reducing vibration and wind noise while driving is achieved, in addition to the above mentioned advantages.

In the example shown, the mirror 100 further includes a low-friction wear-resistant ring 160. This low-friction wear-resistant ring 160 is mounted between the base element 105 and the rearview mirror housing 110, and in particular between the motor recess 125 and the elastic ring 150. The rearview mirror assembly 100 is completed by locking elements 170, 180, and in particular a upper vertical limiting member 170 and a lower vertical limiting member 180.

The upper vertical limiting member 170 comprises a cylindrical body 175. The cylindrical body 175 is suitably adapted to be disposed, in the assembled position, inside the compression spring 140, the lower vertical limiting member 180, the elastic ring 150 and the low-friction wear-resistant ring 160, as shown in the exploded view of FIG. 3. The upper vertical limiting member 170 further comprises an upper end of run surface 176 whose diameter is greater than the diameter of cylindrical body 175 so that it protrudes therefrom so that the compression spring 140 is arranged biased against the lower surface of such upper end of run surface 176, as shown in FIG. 3 of the drawings. The compression spring 140 is compressed against the upper vertical limiting element 170 during manual rotation of the rearview mirror housing 110. The upper vertical limiting member 170 further comprises radial anchoring projections 177 formed on a bottom portion of the cylindrical body 175 for fastening the upper vertical limiting member 170. Other technically equivalent arrangements may be used to perform the same function.

For its part, the lower vertical limiting member 180 comprises a disc. The elastic ring 150 is suitably designed to be vertically compressed against the lower vertical limiting member 180 during rotation of the rearview mirror housing 110 by the motor component 120

Driving of the mirror housing 110 to be rotated, either through the motor component 120 or manually, has to overcome the inherent resistance of an inclined plane plus the force exerted by the resilient element 140, 150 when going from the operating position, substantially transverse to the vehicle body, to the folded position, aligned substantially lengthwise with the vehicle body. The compression of the resilient element 140, 150 provides uniform and continuous contact between ramps 10, 20, 11, 21.

When the first and second sets of ramps 10, 20 have overcome the ramps 11, 21 of the base element 105, the ramps of the first and second sets of ramps 10, 20 reach a flat area 15, 25 of the base element 105, as shown in FIG. 3. At this point, compression of the resilient element 140, 150 is kept constant and clearance between the rearview mirror housing 110 and the base element 105 is also kept constant.

When actuating to the operating position, the operation is reversed, such that the force exerted by the motor component 120 or manually by the user, depending on the case, must overcome the frictional force in the opposite direction. When the ramps of the first or second set of ramps 10, 20 meet the respective ramps 11, 21 of the base element 105, contact is very homogeneous and continuous due to the weight of the rearview mirror housing 110 and the compression force provided by the respective resilient element 140, 150.

Importantly, actuation of the rearview mirror housing 110 through the motor component 120 is compatible with the manual operation of the rearview mirror housing 110, and both actuations are performed independently and not simultaneously, through its own ramps 10, 20 sliding on different ramps 11, 21 of the base element 105 of the mirror 100.

Although only a number of particular examples of the invention have been disclosed herein, it will be understood by those skilled in the art that other alternative examples and/or uses of the invention and obvious modifications and equivalents thereof are possible. Furthermore, the present invention covers all possible combinations of the particular examples described. Reference signs related to drawings and placed in parentheses in a claim, are solely for attempting to increase the intelligibility of the claim, and shall not be construed as limiting the scope of the claim. The scope of the present disclosure should not be limited to specific examples, but should be determined only by a fair reading of the appended claims.

The invention claimed is:

1. Folding rearview mirror for motor vehicles comprising:
   a base element to be mounted on a vehicle,
   a housing containing a mirror element,
   a motor component adapted to drive the mirror housing to rotate relative to the base element around an axis of rotation Y between an operating position of the rearview mirror and a folded position of the rearview mirror; and,
   at least a first set of ramps and a second set of ramps, independent of each other, so that they can be moved relative to each other, and
   said ramps of said first and second sets being adapted to slide on corresponding first and second fixed ramps formed on the base element to rotate the rearview mirror housing relative to the base element between the operating position and the folded position of the rearview mirror resulting in the displacement of the rearview mirror housing relative to the base element;
   wherein the ramps of the first set of ramps are arranged in an innermost area with respect to the ramps of the second set of ramps, and wherein the second set of ramps is formed as part of an outer housing of the motor component;
   wherein the ramps of the first set of ramps have an inclination adapted for manual actuation to rotate the mirror housing relative to the base element, and the ramps of the second set of ramps have an inclination equal to or less than that of the first set of ramps, suitable for driving the mirror housing to rotate relative to the base element by the motor component;
   wherein when the rearview mirror housing is rotated either manually or by the motor component relative to the base element, the ramps of the second set of ramps slide on the corresponding ramps of the base element causing the rearview mirror housing to move closer to or away from the base element.

2. Rearview mirror as claimed in claim 1, wherein the first set of ramps comprises at least one ramp formed in a gearwheel associated with the motor component adapted to slide over at least a corresponding ramp formed in the base element.

3. Rearview mirror as claimed in claim 1, wherein the second set of ramps has at least one ramp formed in a recess in the motor component adapted to slide on at least a corresponding ramp formed in the base element.

4. Rearview mirror as claimed in claim 1, wherein it further comprises a first resilient element intended to push the rearview mirror housing to the base element during manual operation to rotate the mirror housing relative to the base element.

5. Rearview mirror as claimed in claim 4, further comprising a second resilient element intended to push the rearview mirror housing to the base element during driving the rearview mirror housing to rotate relative to the base element through the motor component.

6. Rearview mirror as claimed in claim 5, wherein the first resilient element has a spring rate higher than that of the second resilient element.

7. Rearview mirror as claimed in claim 4, wherein the first resilient element comprises a spring.

8. Rearview mirror as claimed in claim 1, further comprising a second resilient element intended to push the rearview mirror housing to the base element during driving the rearview mirror housing to rotate relative to the base element through the motor component.

9. Rearview mirror as claimed in claim 8, wherein the second resilient element is intended to push the rearview mirror housing to the base element through the motor component.

10. Rearview mirror as claimed in claim 8, wherein the second resilient element comprises an elastic ring which, during operation, is capable of being compacted to a thickness between 0.1 and 10 mm.

11. Rearview mirror as claimed in claim 10, wherein the second resilient element comprises an elastic ring which, during operation, is capable of being compacted to a thickness between 2 and 6 mm.

12. Rearview mirror as claimed in claim 1, wherein the motor component comprises an electric motor meshing with a gearwheel attached to the base element.

13. Rearview mirror as claimed in claim 1, further comprising a low-friction wear-resistant ring arranged between the mirror housing and the base element.

14. Rearview mirror as claimed in claim 13, wherein the low-friction wear-resistant ring is arranged between the motor component and the base element.

15. Rearview mirror as claimed in claim 13, wherein the low-friction wear-resistant ring is arranged between the rearview mirror housing and the second resilient element.

* * * * *